Nov. 20, 1928.
M. L. PATTERSON
RADIO DIRECTION AND POSITION FINDER
Filed May 21, 1923  2 Sheets-Sheet 1
1,692,051
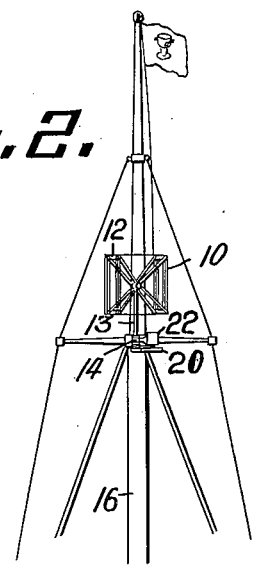
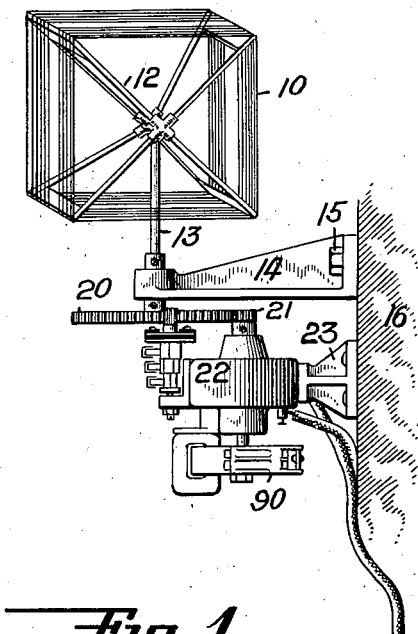
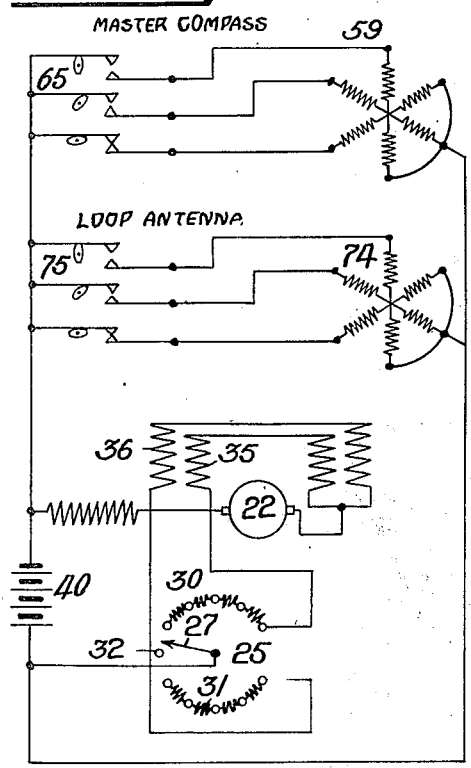
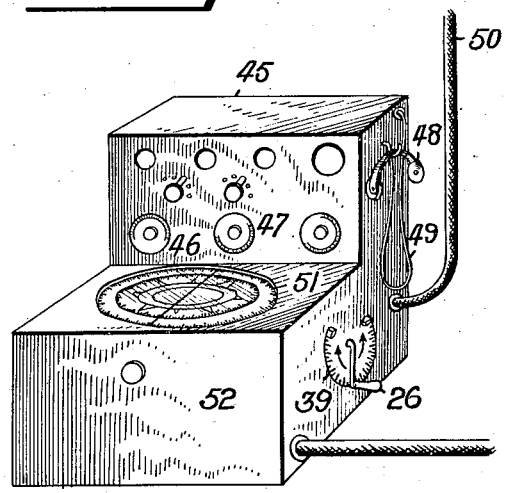
Inventor
Martin L. Patterson
By his Attorney
Herbert H. Thompson Nov. 20, 1928.
M. L. PATTERSON
1,692,051
RADIO DIRECTION AND POSITION FINDER
Filed May 21, 1923
2 Sheets-Sheet 2
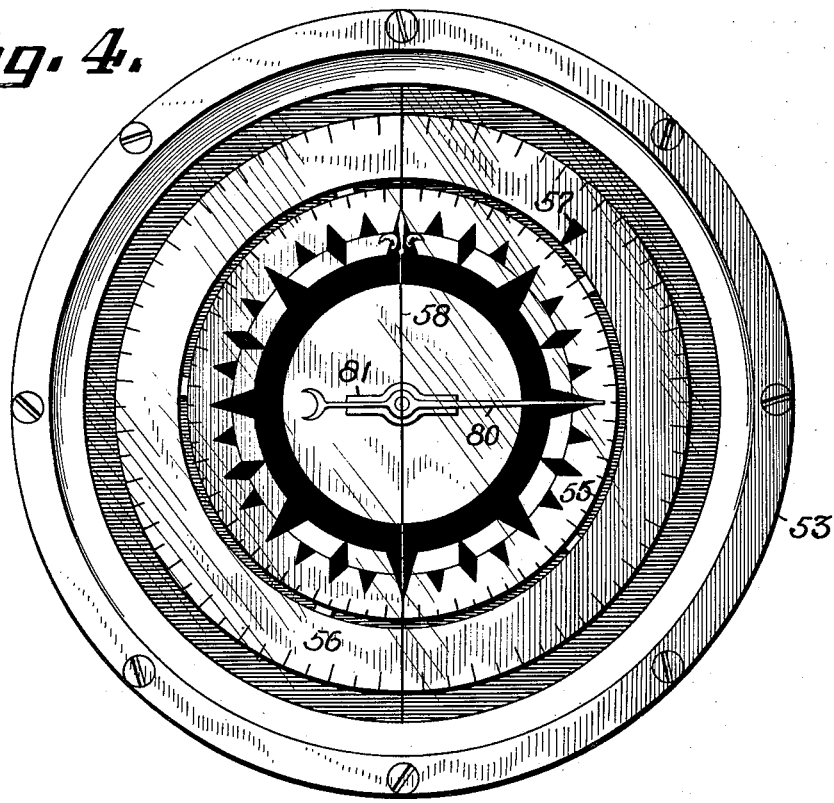
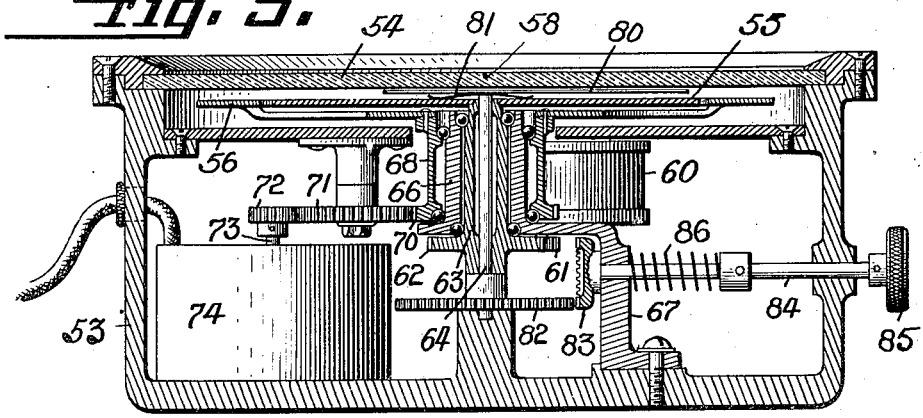
Inventor
Martin L. Patterson
By his Attorney
Herbert H. Thompson Patented Nov. 20, 1928.

1,692,051

UNITED STATES PATENT OFFICE.

MARTIN L. PATTERSON, OF BOGOTA, NEW JERSEY, ASSIGNOR TO THE SPERRY GYROSCOPE COMPANY, OF BROOKLYN, NEW YORK, A CORPORATION OF NEW YORK.

RADIO DIRECTION AND POSITION FINDER.

Application filed May 21, 1923. Serial No. 640,423.

This invention relates to the art of navigation by the aid of radio direction signals and is an improvement on copending application of Preston R. Bassett, Serial No. 619,843, filed February 19, 1923. More particularly, this invention relates to the system of navigation wherein a plurality of shore stations transmit or broadcast radio signals of different characteristics, the ship being equipped with some form of radio direction finder, whereby the direction from which the signals come may be determined by the ship. By this invention the direction in azimuth of the sending stations may be shown directly to the navigating officer, so that by means of charts the officer may readily determine the exact position of the ship without the necessity for taking bearings from the sun or relying on dead reckoning.

It is a further object of my invention to mount the radio direction finder upon a vessel in such position as to eliminate deviation of the electrical waves by the hull and the consequent necessity for correction. For this purpose I mount the direction finder preferably high on the mast of the vessel beyond the field of influence of the hull.

I provide an indicating device in connection with the radio direction finder for indicating the direction from which the electrical waves emanate, and it is a further object of my invention to position said device at a point on the ship convenient for observation. For this purpose I provide a distant control system whereby I am enabled to position the indicating device at any suitable point on the vessel regardless of the positioning of the radio direction finder.

Other objects and advantages more or less broad than those stated will in part be obvious and in part be specifically referred to in the specification.

In the accompanying drawings,

Fig. 1 is a view of the assembled device forming the subject matter of my invention.

Fig. 2 shows the radio direction finder mounted upon the upper end of a ship's mast.

Fig. 3 is a wiring diagram.

Fig. 4 is a plan view of the bearing indicator.

Fig. 5 is a vertical section through the bearing indicator of Fig. 4.

Referring to the drawings, there is shown a radio antenna 10 consisting of a closed coil (inductance type) of several layers of wire wound upon a suitable frame 12. As will be understood by those skilled in the art, when the plane of such coil is turned parallel to the direction from which a radio signal emanates, the intensity of the signal will be a maximum. As the coil is revolved, the intensity of the signal diminishes until a minimum is reached when the plane of the coil comes to a position at right angles to the line of direction from the signal. The frame 12 is mounted on the upper end of a vertical shaft 13 journaled in a bracket 14 fixed, as shown at 15, to the mast 16 of a ship. The mechanism thus far described is preferably positioned near the upper end of the mast, as shown in Fig. 2, so that the electric waves to which antenna 10 responds will not be deflected or distorted by any part of the vessel, since in such position the antenna is beyond the wave-disturbing field of the vessel.

The lower end of shaft 13 is provided with a gear 20 meshing with a gear 21 on the end of the shaft of an operating motor 22 fixed to the mast by a bracket 23. The motor coil, and interconnecting gearing thus form a unit mounted high up on the mast.

For operating the motor 22 in one direction or the other, there may be provided a switch 25 which comprises a handle 26 to which is connected a conductor 27 adapted to operate over a plurality of resistances 30, 31, of diminishing magnitude and over a neutral contact 32. The resistances 30 are adapted to be put in series with one field coil 35 of the motor 22, while the resistances 31 are in series with the other field coil 36 of said motor. The neutral contact 32 is disconnected from either field coil. The current is supplied from any suitable source such as 40, by way of switch 25 and thence through resistances 30 or 31 (depending upon the direction of movement of the handle 26 to one side or the other of contact 32) to field coil 35 or 36 to drive the motor in one direction or the other. The speed of the motor will depend of course upon the position of contact 27 on the resistances, the speed increasing as the contact 27 rotates away from contact 32. Handle 26 may cooperate with a scale 39 to indicate the position of contact 27 on the rheostat, and, hence, the speed of rotation of the motor 22.

In operation, the motor is driven at relatively rapid speed until the coil approaches the position where the signal is of minimum intensity. At this stage the handle 26 is rotated to move contact 27 toward contact 32 thus diminishing the speed of motor 22 until when the position of minimum intensity of the signal is reached the contact 27 is moved into engagement with neutral contact 32 to stop the motor. If the position of minimum intensity is overrun, the motor is operated in the reverse direction.

For determining the position of minimum intensity of a signal a radio receiving set within a container 45 may be provided. Said container is shown as provided with the usual tuning and resistance adjustments 46, 47, and with the head telephones 48 which may be connected by a wire 49 to the container 45. Within said container may be mounted also the motor-controlling switch 25, the handle 26 projecting outside thereof. The switch is connected to the motor 22 by a conductor-cable 50 so that the container 45 may be positioned in any desired part of the ship remote from the antenna and its operating motor which are positioned on the upper end of the mast.

For indicating the position of the signal sending station, there may be provided an indicator 51 preferably within the container 45 in an extension 52 thereof. Said indicator comprises a casing 53 mounted within container 45 and having a transparent upper face 54. The indicator includes a bearing indicator comprising a compass card 55 and a ring 56, hereinafter termed the radio ring, said ring having an index 57 thereon. The lubber-line 58 is etched or otherwise formed on the glass-cover, said line corresponding to the fore-and-aft axis of the ship and cooperating with the compass card to indicate the ship's bearing. The ring 56 is operatively connected to the antenna and cooperates with the compass card to indicate the direction of the signal sending stations. The card is actuated from a repeater motor 60 through a pinion 61 on the motor shaft meshing with a gear 62 on sleeve 63, said sleeve being journaled on the spindle 64 and carrying at its upper end the card 55. The repeater motor 60 is actuated from a master gyroscopic compass (not shown) (see Fig. 3) by means of a transmitter 65 operated thereby, in a manner well-known in the art, see patent to Sperry No. 1,229,640, granted March 4, 1919. Said bearing indicator therefore being goverened by the master compass may be rigidly mounted in the container 45 in any position and need not be suspended in gimbals, since it is totally unaffected by the rolling and pitching of the ship.

The sleeve 63 is journaled within a bearing 66 formed in a bracket 67 fixed within the casing 53. Upon the outer surface of bearing 66 is rotatably mounted a hub 68 which supports at its upper end the ring 56. At its lower end said hub is provided with a crown gear 70 meshing with an idler gear 71 driven by a pinion 72 at the upper end of a shaft 73 of a repeater motor 74. Said motor 74 is operated from a transmitter 75 actuated by motor 22. The movements of the antenna will thus be transmitted to the ring 56, the indicator 57 of which cooperates with the compass card to indicate the bearing of the sending station when the antenna is positioned to yield a minimum intensity of signal as determined by the radio receiving apparatus.

It is well understood in the art that in order to predetermine its position, a ship will receive signals from a plurality of shore stations. The antenna will be turned successively to receive the minimum signal from each shore station. After the antenna has been rotated to receive the minimum signal from a shore station, and the ring 56 has been rotated to indicate the bearing of said station, a pointer 80 may be set to coincide with index 57. In this manner a visible record of the bearing of the first station remains after the operator turns the antenna (and therefore ring 56) to receive the minimum signal from the second shore station. Said pointer 80 may be carried at the upper end of shaft 64 above the compass-card with which it is held in frictional engagement by a spring 81. To rotate shaft 64 and pointer 80, said shaft carries at its lower end a gear 82 with which is adapted to mesh a crown gear 83 carried at the end of a shaft 84 extending through the casing and provided on its outer end with a knurled knob 85. Shaft 84 is normally pressed outwardly by a compression spring 86 to maintain gear 83 out of mesh with gear 82. When it is desired to rotate the pointer 80, shaft 84 is pressed inwardly against the action of spring 86 to move gear 83 into mesh with gear 82.

To facilitate rapid reversal of the motor 22 the latter may be provided with a brake 90 of known construction.

In accordance with the provisions of the patent statutes, I have herein described the principle of operation of my invention, together with the apparatus, which I now consider to represent the best embodiment thereof, but I desire to have it understood that the apparatus shown in only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is, 1. In a radio direction finder for ships, a rotatable antenna positioned beyond the effective wave-disturbing field of said ship, a motor for rotating said antenna mounted adjacent thereto, a bearing indicator operatively connected to said antenna and positioned within said field, and a controller in said field for controlling said motor.

2. In a radio direction finder for ships, a rotatable antenna positioned beyond the effective wave-disturbing flux of said ship, a motor for rotating said antenna mounted adjacent thereto, a bearing indicator, a controller positioned in said field, and an electric repeater system connecting said antenna and said indicator, said controller controlling the operation of said motor.

3. In a radio direction finder for ships, a plurality of concentrically mounted rotatable indicators, a repeater motor adapted to be actuated from a master compass for turning one of said indicators, a second repeater motor adapted to be actuated from a rotatable antenna for turning the second of said indicators, and manual means for adjusting the position of the third of said indicators.

In testimony whereof I have affixed my signature.

MARTIN L. PATTERSON.